UNITED STATES PATENT OFFICE.

JOHN W. HASBURG, OF CHICAGO, ILLINOIS.

PROCESS OF MAKING GOLD PIGMENT.

1,057,422. Specification of Letters Patent. Patented Apr. 1, 1913.

No Drawing. Application filed November 13, 1911. Serial No. 660,103.

*To all whom it may concern:*

Be it known that I, JOHN W. HASBURG, a citizen of the United States, residing at Chicago, in the county of Cook and State of Illinois, have invented certain new and useful Improvements in Processes of Making Gold Pigment, of which the following is a specification.

My invention relates to improvements in gold paint, and has for one of its objects to provide an easily manipulated and simple process for reducing gold to its finest possible comminuted state, thereby to produce a smooth, uniform, and easily to be manipulated, product, capable of covering a relatively large surface as when gold is used in paint, especially for ceramic and glass decoration.

The usual process of precipitating metallic gold from its chlorid with mercurous nitrate or ferrous sulfate produces a precipitation of very coarse grain, the product therefore covering a relatively small surface compared with paint made by my new process.

In carrying out my process I first prepare a solution of gold chlorid—such solutions usually are acid in reaction to litmus paper turning blue litmus to red—I then add to this gold solution an excessive quantity of an alkali, such for instance as potassium hydroxid. The effect of this, if carefully added, is to form a precipitate which, however, redissolves as this alkali becomes in excess, as indicated by the fact that a piece of red litmus paper placed in the solution is strongly turned to blue. To this solution mercurous nitrate is now added until no further precipitate forms. The precipitate is now separated from the liquid and preferably washed and then treated with an excess of acid, for example nitric acid, which dissolves any mercury compounds in the precipitate and it is then thoroughly washed. By this treatment the gold is left in an exceedingly fine amorphous condition, which is mixed with a suitable flux such as the oxid, hydroxid, or subnitrate of bismuth or the borate or oxids of lead or other like metallic compounds and prepared for use as a paint by grinding with a resinous balsam in the usual manner.

I have here given a preferred method but ferrous sulfate may be employed instead of mercurous nitrate as a precipitant and some other alkali, such as sodium hydrate or the carbonates of the alkalis may be used. Also, in cases where ferrous sulfate is employed, sulfuric acid instead of nitric acid may be used.

I do not wish to confine myself to precise quantities or procedure but any one skilled in the art can readily produce the product described.

Having fully described my invention, what I claim and desire to secure by Letters Patent, is:

1. The herein described steps in the process of making gold pigment which consist in adding a hydroxid, carbonate or bicarbonate of an alkali metal to a solution of gold chlorid, and then precipitating the gold with a metallic salt.

2. The herein described steps in the process of making gold pigment which consist in adding a hydroxid, carbonate or bicarbonate, of an alkali to a solution of gold chlorid, then precipitating the gold with a metallic salt, and then adding an acid to dissolve the precipitated basic metal oxid from the gold.

3. The herein described steps in the process of making gold pigment which consist in adding a hydroxid, carbonate or bicarbonate, of an alkali to a solution of gold chlorid, then precipitating the gold with a metallic salt, washing the precipitate so formed, then adding an acid to dissolve the precipitated basic metal oxid, washing and drying the resultant precipitate, and adding a flux containing lead borate to the gold residue.

4. The herein described steps in the process of making gold pigment which consists in adding a hydroxid, carbonate or bicarbonate of an alkali in excess to a solution of gold chlorid, then adding to said gold solution a metallic salt precipitant and then adding an acid to dissolve the precipitated basic metal oxid from the gold.

In testimony whereof I hereunto set my hand in the presence of two witnesses.

JOHN W. HASBURG.

In the presence of—
MARY F. ALLEN,
W. LINN ALLEN.